Patented Jan. 6, 1948

2,433,979

UNITED STATES PATENT OFFICE 2,433,979

METHODS OF PREPARING α-AMINO ACIDS AND N-SUBSTITUTED-α-AMINO ACIDS

John H. Billman, Bloomington, Ind.

No Drawing. Application October 5, 1945, Serial No. 620,643

16 Claims. (Cl. 260—531)

This invention relates to methods of preparing α-amino acids and N-substituted-α-amino acids.

The present application is a continuation in part of my copending application Serial No. 411,555, filed September 19, 1941, now Patent No. 2,394,230, granted February 5, 1946.

Amino acids have long been recognized as essential to biological processes in most living things and more recently have been utilized to sustain life. Numerous methods have heretofore been employed for the synthesis of these amino acids and more particularly the α-amino acids. For example, some of these methods have been used which involve the amination of α-halogenated acids, the Gabriel synthesis, and the Strecker synthesis. All of these methods, however, have the common disadvantage of being rather lengthy, expensive, and usually yielding small amounts of amino acids.

In accordance with this invention, α-amino acids and N-substituted-α-amino acids are prepared by a method which is efficient and economical. This method comprises protecting the amino group of a β-amino alcohol containing no aliphatic unsaturated group, oxidizing the protected β-amino alcohol to the corresponding α-amino acid by converting its methylol group into a carboxyl group, and then removing the protecting group. This protection is achieved by reacting the β-amino alcohol with an aldehyde, either aromatic or aliphatic; which aldehyde contains a divalent group which attaches itself to and protects by rendering unoxidizable the amino radical of the β-amino alcohol during the subsequent oxidation of the methylol group of the alcohol to the carboxyl group. That divalent group which protects the amino radical during oxidation of the β-amino alcohol and which is derived from the aldehyde is:

(1) 

in which R is an alkyl radical or an aryl radical containing no unsaturated aliphatic substituent and containing no non-hydrocarbon oxidizable substituent. Examples of the radical R are the monovalent radicals derived from ethane, propane, chloroethane, benzene, chlorotoluene, nitrobenzene, chlorobenzene, naphthalene, benzoic acid, benzene sulfonic acid, diphenyl, anisole, ethyl benzoate, and ethyl ether.

The reaction which takes place in protecting the β-amino alcohol by reaction with an aldehyde is represented by the following equation:

(2) 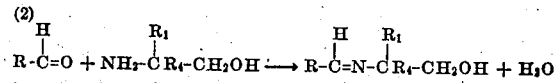

in which each of $R_1$ and $R_4$ is hydrogen, an alkyl radical, or an aryl radical containing no unsaturated aliphatic group.

The resulting protected β-amino alcohol is then oxidized to the corresponding α-amino acid, by converting the methylol group of the alcohol to a carboxyl group. This oxidation may be performed by any suitable oxidizing agent, such as: a metallic permanganate, for example an alkali-metal permanganate, an alkaline-earth metal permanganate, or zinc permanganate, in an aqueous medium of any reaction, whether alkaline, acid, or neutral; a chromic oxidizing agent, including chromic acid $CrO_3$, metallic dichromates, and metallic chromates, such as sodium dichromate, in an acid medium; an oxidizing acid, including, in addition to the chromic acid already named, persulfuric acid, chloric acid, or nitric acid; lead peroxide; or ferric chloride; all of which oxidizing agents lie between ferric chloride and persulfuric acid inclusive in the series of oxidation-reduction potentials. (For instance, see "Oxidation Potentials," by Latimer, published in New York by Prentiss-Hall, Inc., in 1938, pages 293 et seq.) Preferably the reaction is performed between 0° C. and the boiling point of the reaction mixture.

The oxidizing reaction which takes place is represented as follows:

(3) 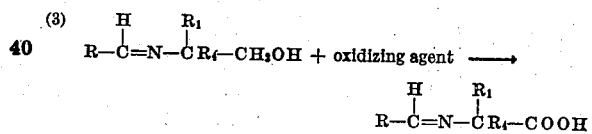

Sometimes the resulting product, instead of being an acid as indicated by Equation 3, might be a salt of the acid, such as the sodium salt. A salt is formed if the oxidation is performed in a basic medium, such as in the presence of sodium hydroxide or sodium carbonate.

After the protected β-amino alcohol has thus been oxidized to the corresponding α-amino acid, the resulting compound is decomposed (hydrolyzed) to form an α-amino acid. This decomposition (or hydrolysis) may, for example, be accomplished by hydrolyzing the resulting oxidation compound with a mineral acid, such as hydrochloric or sulfuric acid, or a base, such as sodium or barium hydroxide.

The overall reaction which takes place is represented as follows:

(4)
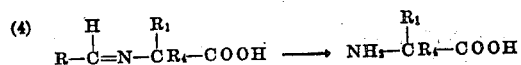

Typical examples of the method in accordance with the invention of this application are as follows:

*Example 1.*—Preparation of α-amino isobutyric acid.

Twenty grams of β-amino isobutanol are added to 50 cc. of water containing 12 g. of sodium hydroxide. 24 g. of benzaldehyde are added, to produce N-benzylidene-β-amino isobutanol. Heat is evolved and two layers formed. To the mixture are now added 47.3 g. of potassium permanganate, which oxidizes the N-benzylidene-β-amino-isobutanol to N-benzylidene-α-amino-isobutyric acid. Upon completion of the oxidation, the manganese dioxide produced is removed and the filtrate is hydrolyzed with hydrochloric acid to remove the benzylidene radical and form the hydrochloride of α-amino-isobutyric acid; and the solution is evaporated to dryness. By treatment with pyridine and alcohol, the hydrochloride of the amino acid is decomposed to liberate the free α-amino-isobutyric acid.

*Example 2.*—Preparation of α-amino propionic acid.

Twenty grams of β-amino propanol are reacted with 12 g. of acetaldehyde in the presence of sodium hydroxide to produce N-ethylidene-β-aminopropanol. To this solution are added 55 g. of potassium permanganate as in Example 1, but in this case to oxidize the N-ethylidene-β-amino propanol to N-ethylidene-α-amino propionic acid. Upon completion of the oxidation, the manganese dioxide produced is filtered off, and the filtrate is hydrolyzed with dilute hydrochloric acid—about 20 to 25%—to remove the ethylidene group, and leave the hydrochloride of α-amino-propionic acid. The solution is then evaporated to dryness and treated with pyridine and methyl alcohol to obtain the free α-amino-propionic acid.

*Example 3.*—Preparation of glycine (α-amino-acetic acid).

Thirty-two grams of β-amino ethanol are reacted with 24 grams of acetaldehyde, desirably in the presence of sodium hydroxide, to produce N-ethylidene-β-aminoethanol. To this are added 110 grams of potassium permanganate as in Examples 1 and 2, but in this case to oxidize the N-ethylidene-β-aminoethanol to N-ethylidene-α-aminoacetic acid. Upon completion of the oxidation, the manganese dioxide produced is filtered off, and the filtrate is hydrolyzed with 20 percent hydrochloric acid to remove the ethylidene group, and leave the hydrochloride of α-amino-acetic acid. The solution is then evaporated to dryness and treated with pyridine and methyl alcohol to obtain the free α-amino acetic acid.

As the foregoing formulas and examples show, the β-amino alcohols and the N-substituted-β-amino alcohols used are always primary alcohols; and so by the terms "β-amino alcohol" and "N-substituted-β-amino alcohol" I mean such primary alcohols.

What is claimed is:

1. The method of producing a composition selected from the class consisting of α-amino acids and N-substituted-α-amino acids, which comprises treating a lower β-amino alkanol with an aldehyde of the class consisting of acetaldehyde and benzaldehyde, and oxidizing the methylol group of the resulting N-substituted-β-amino alkanol to a carboxyl group by treating said last-named alkanol with potassium permanganate in an alkaline medium.

2. The method of producing a composition selected from the class consisting of α-amino acids and N-substituted-α-amino acids, which comprises treating with potassium permanganate in an alkaline medium an N-substituted-β-amino alkanol in which the N-substituent is a member of the class consisting of ethylidene and benzylidene.

3. The method of producing an α-amino acid, which comprises treating a lower β-amino alkanol with an aldehyde of the class consisting of acetaldehyde and benzaldehyde, oxidizing the methylol group of the resulting N-substituted-β-amino alkanol to a carboxyl group by treating said last-named alkanol with potassium permanganate in an alkaline medium, and hydrolyzing the resulting N-substituted-α-amino acid to form an α-amino acid.

4. The method of producing an α-amino acid, which comprises treating with potassium permanganate in an alkaline medium an N-substituted-β-amino alkanol in which the N-substituent is a member of the class consisting of ethylidene and benzylidene, and hydrolyzing the resulting N-substituted-α-amino acid to form an α-amino acid.

5. The process of producing a composition selected from the class consisting of α-amino isobutyric acid and N-benzylidene-α-amino isobutyric acid, which consists in reacting β-amino isobutanol with benzaldehyde, and reacting the resulting N-benzylidene-β-amino isobutanol with potassium permanganate in an alkaline medium.

6. The process of producing a composition selected from the class consisting of α-amino isobutyric acid and N-benzylidene-α-amino isobutyric acid, which consists in oxidizing N-benzylidene-β-amino isobutanol by treating it with potassium permanganate in an alkaline medium.

7. The process of producing α-amino isobutyric acid, which consists in reacting β-amino-isobutanol with benzaldehyde, reacting the resulting N-benzylidene-β-amino isobutanol with potassium permanganate in an alkaline medium, and removing the benzylidene radical from the resultant N-benzylidene-α-amino isobutyric acid by hydrolysis.

8. The method of producing α-amino isobutyric acid, which consists in treating N-benzylidene-β-amino isobutanol with potassium permanganate in an alkaline medium, and removing the benzylidene group from the resultant N-benzylidene-α-amino isobutyric acid by hydrolysis.

9. The process of producing a composition selected from the class consisting of α-amino propionic acid and N-ethylidene-α-amino propionic acid, which consists in reacting β-amino propanol with acetaldehyde, and reacting the resulting N-ethylidene-β-amino propanol with potassium permanganate in an alkaline medium.

10. The process of producing a composition selected from the class consisting of α-amino propionic acid and N-ethylidene-α-amino propionic acid, which consists in oxidizing N-ethylidene-β-amino propanol by treating it with potassium permanganate in an alkaline medium.

11. The process of producing α-amino propionic acid, which consists in reacting β-amino-propanol with acetaldehyde, reacting the resulting N-ethylidene-β-amino propanol with potassium permanaganate in an alkaline medium, and removing the ethylidene radical from the resultant N-ethylidene-α-amino propionic acid by hydrolysis.

12. The method of producing α-amino propionic acid, which consists in treating N-ethylidene-β-amino propanol with potassium permanganate in an alkaline medium, and removing the ethylidene group from the resultant N-ethylidene-α-amino propionic acid by hydrolysis.

13. The process of producing a composition selected from the class consisting of α-amino acetic acid and N-ethylidene-α-amino acetic acid, which consists in reacting β-amino ethanol with acetaldehyde, and reacting the resulting N-ethylidene-β-amino ethanol with potassium permanganate in an alkaline medium.

14. The process of producing a composition selected from the class consisting of α-amino acetic acid and N-ethylidene-α-amino acetic acid, which consists in oxidizing N-ethylidene-β-amino ethanol by treating it with potassium permanganate in an alkaline medium.

15. The process of producing α-amino acetic acid, which consists in reacting β-amino-ethanol with acetaldehyde, reacting the resulting N-ethylidene-β-amino ethanol with potassium permanganate in an alkaline medium, and removing the ethylidene radical from the resultant N-ethylidene-α-amino acetic acid by hydrolysis.

16. The method of producing α-amino acetic acid, which consists in treating N-ethylidene-β-amino ethanol with potassium permanganate in an alkaline medium and removing the ethylidene group from the resultant N-ethylidene-α-amino acetic acid by hydrolysis.

JOHN H. BILLMAN.